United States Patent
Tanahashi et al.

[11] Patent Number: 6,081,969
[45] Date of Patent: Jul. 4, 2000

[54] HINGE FOR ELECTRONIC APPARATUS AND ELECTRONIC APPARATUS EQUIPPED WITH HINGE

[75] Inventors: Makoto Tanahashi, Kanagawa; Tsutomu Asawa, Nagano, both of Japan

[73] Assignee: Sony Corporation, Tokyo, Japan

[21] Appl. No.: 09/159,745

[22] Filed: Sep. 23, 1998

[30] Foreign Application Priority Data

Sep. 25, 1997 [JP] Japan ................................. 9-260045

[51] Int. Cl.$^7$ ............................. E05D 11/08; E05D 11/00
[52] U.S. Cl. ............................. 16/337; 16/223; 16/385; 361/681; 361/707; 361/711
[58] Field of Search ............................. 16/337, 340, 385, 16/223; 165/77, 86, 89, 104.33; 361/681, 687, 707, 706, 711, 712

[56] References Cited

U.S. PATENT DOCUMENTS

| | | | |
|---|---|---|---|
| 3,844,341 | 10/1974 | Bimshas, Jr. et al. | 361/681 |
| 4,709,121 | 11/1987 | Shores | 16/382 |
| 5,001,659 | 3/1991 | Watabe | 16/221 |
| 5,129,448 | 7/1992 | Holmberg, Jr. et al. | 16/385 |
| 5,608,604 | 3/1997 | Francis | 361/681 |
| 5,646,822 | 7/1997 | Bhatia et al. | 361/681 |
| 5,832,987 | 11/1998 | Lowry et al. | 361/681 |
| 5,894,633 | 4/1999 | Kaneko | 16/337 |

*Primary Examiner*—Chuck Y. Mah
*Attorney, Agent, or Firm*—Frommer, Lawrence & Haug, LLP; William S. Frommer

[57] ABSTRACT

Disclosed is a hinge for electronic apparatus which is capable of effecting heat dissipation without having to increase the size of the electronic apparatus. Hinges 1A and 1B for electronic apparatus are provided for the purpose of foldably connecting a first portion 2 and a second portion 3 of an electronic apparatus. Each hinge includes a stationary member 11 which has a strength maintaining portion 11a for maintaining mechanical strength and a heat conducting portion 12 for effecting heat conduction and which is provided on the first portion 2, a movable member 17 which has a strength maintaining portion 17a for maintaining mechanical strength and a heat conducting portion 13 for effecting heat conduction and which is provided on the second portion 3, and a joint portion 30 for joining the stationary member 11a and the movable member 17 to each other while effecting heat conduction between the heat conducting portion 11a of the stationary member and the heat conducting portion 13 of the movable member.

9 Claims, 9 Drawing Sheets

FIG. 8

| | HINGE OF AN EMBODIMENT OF THIS INVENTION | |
|---|---|---|
| | STATIONARY MEMBER SIDE | MOVABLE MEMBER SIDE |
| 0 sec | 27 | 27 |
| 15 sec | 29 | 27 |
| 30 sec | 30 | 28 |
| 60 sec | 32 | 30 |
| 90 sec | 32 | 31 |
| 120 sec | 34 | 32 |
| 180 sec | 37 | 35 |

FIG. 9

| | ORDINARY HINGE | |
|---|---|---|
| | STATIONARY MEMBER SIDE | MOVABLE MEMBER SIDE |
| 0 sec | 26 | 26 |
| 15 sec | 31 | 26 |
| 30 sec | 35 | 26 |
| 60 sec | 39 | 27 |
| 90 sec | 43 | 27 |
| 120 sec | 47 | 28 |
| 180 sec | 50 | 29 |

FIG. 10

| PHYSICAL CONSTANTS AT 0°C OF HEAT CONDUCTING MATERIALS (UNIT : W/mK) ||
|---|---|
| SILVER | : 428 |
| COPPER | : 403 |
| GOLD | : 319 |
| ALUMINUM | : 236 |
| MAGNESIUM | : 157 |
| IRON | : 83.5 |
| 18-8 STAINLESS STEEL | : 15 |

HINGE FOR ELECTRONIC APPARATUS AND ELECTRONIC APPARATUS EQUIPPED WITH HINGE

BACKGROUND OF THE INVENTION

1. Field of the Invention

The present invention relates to a hinge for an electronic apparatus such as a portable electronic apparatus and to an electronic apparatus equipped with a hinge.

2. Description of the Related Art

Nowadays, a lot of portable electronic apparatuses are on sale, and sophisticated electronic apparatuses on which a CPU (central processing unit) is mounted have appeared. A large amount of power is consumed to drive such electronic apparatuses, and it is necessary to dissipate the heat due to the power consumption to the exterior by various methods.

Of portable electronic apparatuses, a portable computer, for example, is equipped with a main body and a display portion thereof. This display portion can be opened and closed with respect to the main body through the intermediation of a hinge. A typical portable computer of this type is a computer called a notebook personal computer.

Conventionally, in such a mechanical hinge, a stationary member and a movable member of the hinge are mechanically joined together such that the movable member can rotate with respect to the stationary member by a fixed torque. A material satisfying the requisite mechanical strength is adopted for the stationary member, the movable member, etc. However, heat conduction for heat dissipation is not taken into consideration.

In conventional portable electronic apparatuses, a large heat sink is separately provided for natural heat dissipation, or air cooling is forcibly effected by using a fan or the like.

In the case of natural heat dissipation, there is a limitation to the space where the heat sink is provided, so that the quantity of heat that can be dissipated is restricted. In the case of the forced air cooling using a fan or the like, noise is generated by the fan, or power is needed for the driving of the fan.

SUMMARY OF THE INVENTION

It is accordingly an object of the present invention to solve the above problems and to provide a hinge for electronic apparatus and an electronic apparatus equipped with a hinge in which there is no need to increase the size of the electronic apparatus and in which heat dissipation can be effected.

In accordance with the present invention, the above object is achieved by a hinge for electronic apparatus provided for the purpose of foldably joining first and second portions of an electronic apparatus to each other, the hinge comprising: a stationary member which includes strength maintaining portion for maintaining mechanical strength and a heat conducting portion for effecting heat conduction and which is provided on the first portion, a movable member which includes strength maintaining portion for maintaining mechanical strength and a heat conducting portion for effecting heat conduction and which is provided on the second portion, and a joint portion for joining the stationary member and the movable member to each other while effecting heat conduction between the heat conducting portion of the stationary member and the heat conducting portion of the movable member.

In the hinge for electronic apparatus of the present invention, the stationary portion has a strength maintaining portion for maintaining mechanical strength and a heat conducting portion for effecting heat conduction. The joint portion joins the stationary member and the movable member to each other while effecting heat conduction between the heat conducting portion of the stationary member and the heat conducting portion of the movable member.

Due to this construction, there is no need to separately provide the electronic apparatus with a heat dissipating device such as a heat sink or a fan, and the heat conduction between the first and second portions is improved, making it possible for heat conduction to be easily effected from the side where the quantity of heat is larger to the side where it is smaller. Thus, an improvement is achieved in the hinge in terms of thermal conductivity.

In accordance with the present invention, the above object is achieved by an electronic apparatus having a hinge which includes first and second portions, the second portion being foldable with respect to the first portion, the electronic apparatus comprising: a stationary member which includes strength maintaining portion for maintaining mechanical strength and a heat conducting portion for effecting heat conduction and which is provided on the first portion, a movable member which includes strength maintaining portion for maintaining mechanical strength and a heat conducting portion for effecting heat conduction and which is provided on the second portion, and a joint portion for joining the stationary member and the movable member to each other while effecting heat conduction between the heat conducting portion of the stationary member and the heat conducting portion of the movable member.

In the electronic apparatus of the present invention, the stationary member has a strength maintaining portion for maintaining mechanical strength and a heat conducting portion for effecting heat conduction. The movable member has a strength maintaining portion for maintaining mechanical strength and a heat conducting portion for effecting heat conduction. The joint portion joins the stationary member and the movable member to each other while effecting heat conduction between the heat conducting portion of the stationary member and the heat conducting portion of the movable member.

Due to this construction, it is possible for heat conduction to be easily effected from the side where the quantity of heat is larger to the side where it is smaller without having to provide the electronic apparatus with a heat dissipating device such as a heat sink or a fan, improving the heat conduction between the first and second portions. Since the thermal conductivity in the hinge is improved, it is possible to prevent the size of the electronic apparatus from increasing.

BRIEF DESCRIPTION OF THE DRAWINGS

FIG. 8 is a diagram showing data obtained by measuring changes with time in the temperature of a hinge according to an embodiment of the present invention;

FIG. 9 is a diagram showing data obtained by measuring changes with time in the temperature of an ordinary hinge; and FIG. 10 is a diagram showing the physical constants of examples of the material of the heat conducting portions used in the stationary member and the movable member of the present invention.

DETAILED DESCRIPTION OF THE PREFERRED EMBODIMENTS

Preferred embodiments of the present invention will now be described in detail with reference to the accompanying drawings.

The embodiments described below, which are preferred embodiments of the present invention, have various technical restrictions that are regarded as preferable. However, the scope of the present invention is not restricted to these embodiments unless there is a statement to the effect that the present invention is restricted thereto.

Figure 1:
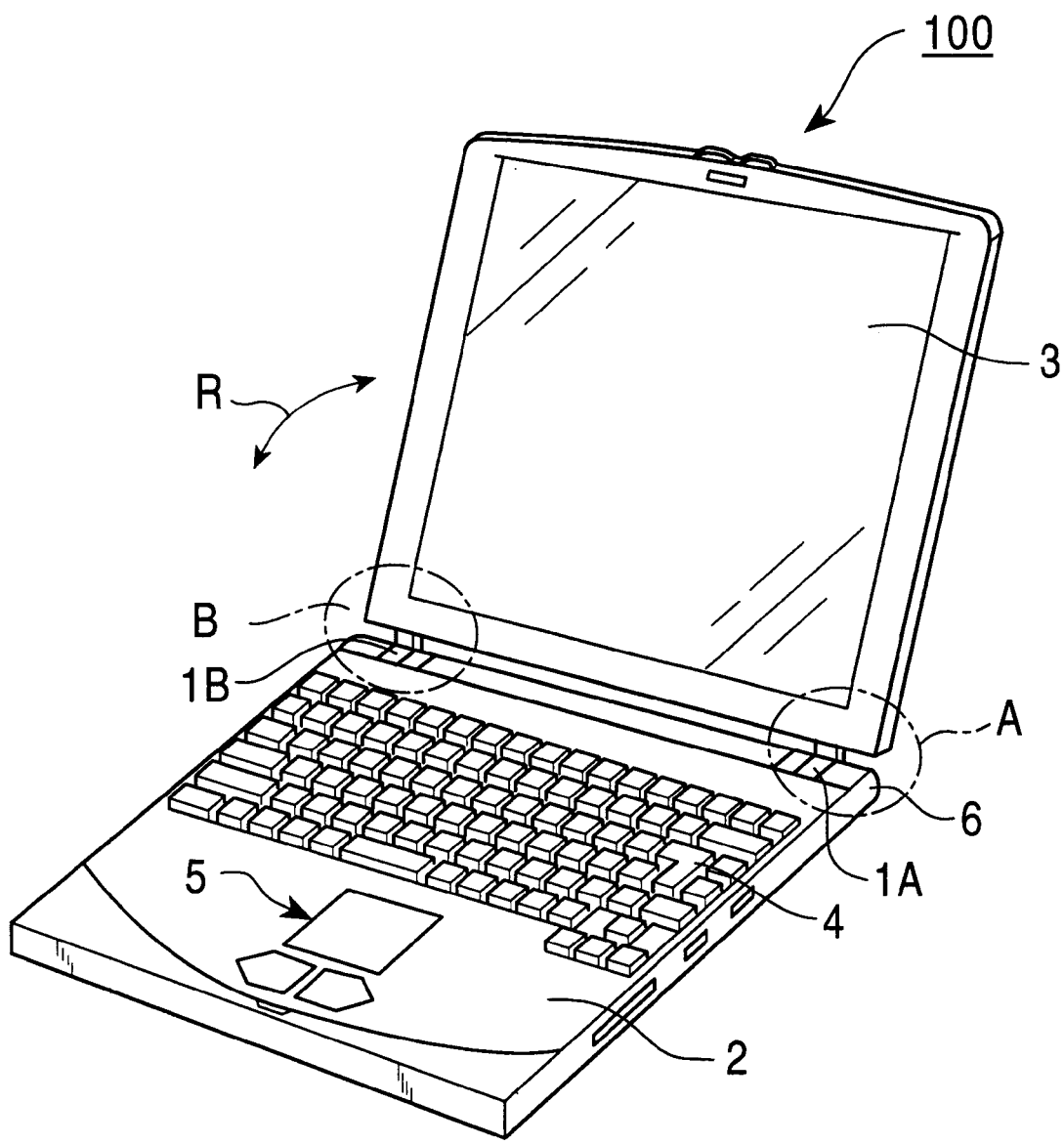
FIG. 1 is a perspective view showing an example of an electronic apparatus to which the hinge for electronic apparatus of the present invention is applied.

FIG. 1 shows an example of an electronic apparatus equipped with a hinge for electronic apparatus according to the present invention. The electronic apparatus shown in FIG. 1 is a portable computer 100. The portable computer 100 includes a main body 2, a display portion 3, a keyboard 4, hinges 1A and 1B encircled by regions A and B, respectively, etc.

In addition to the above-mentioned keyboard 4, the main body 2 includes a pointing device 5, etc. The display portion 3 may consist, for example, of a liquid crystal display device (LCD). The display portion 3 is mounted to the main body 2 such that it can be opened and closed (folded) with respect thereto in the directions indicated by arrows R by means of the hinges 1A and 1B. Further, although not shown in FIG. 1, it is also possible to provide the main body 2 with a device for connecting a mouse or the like, which is an external pointing means.

The hinges 1A and 1B shown in FIG. 1 mechanically connect the display portion 3 to the rear end portion 6 of the main body 6 and, at the same time, have a function by which they effect thermal conduction and heat dissipation.

The hinges 1A and 1B, which are symmetrically arranged, have substantially the same construction. In view of this, the construction and features of only the hinge 1A will be described with reference to FIGS. 2 through 6.

Figure 2:
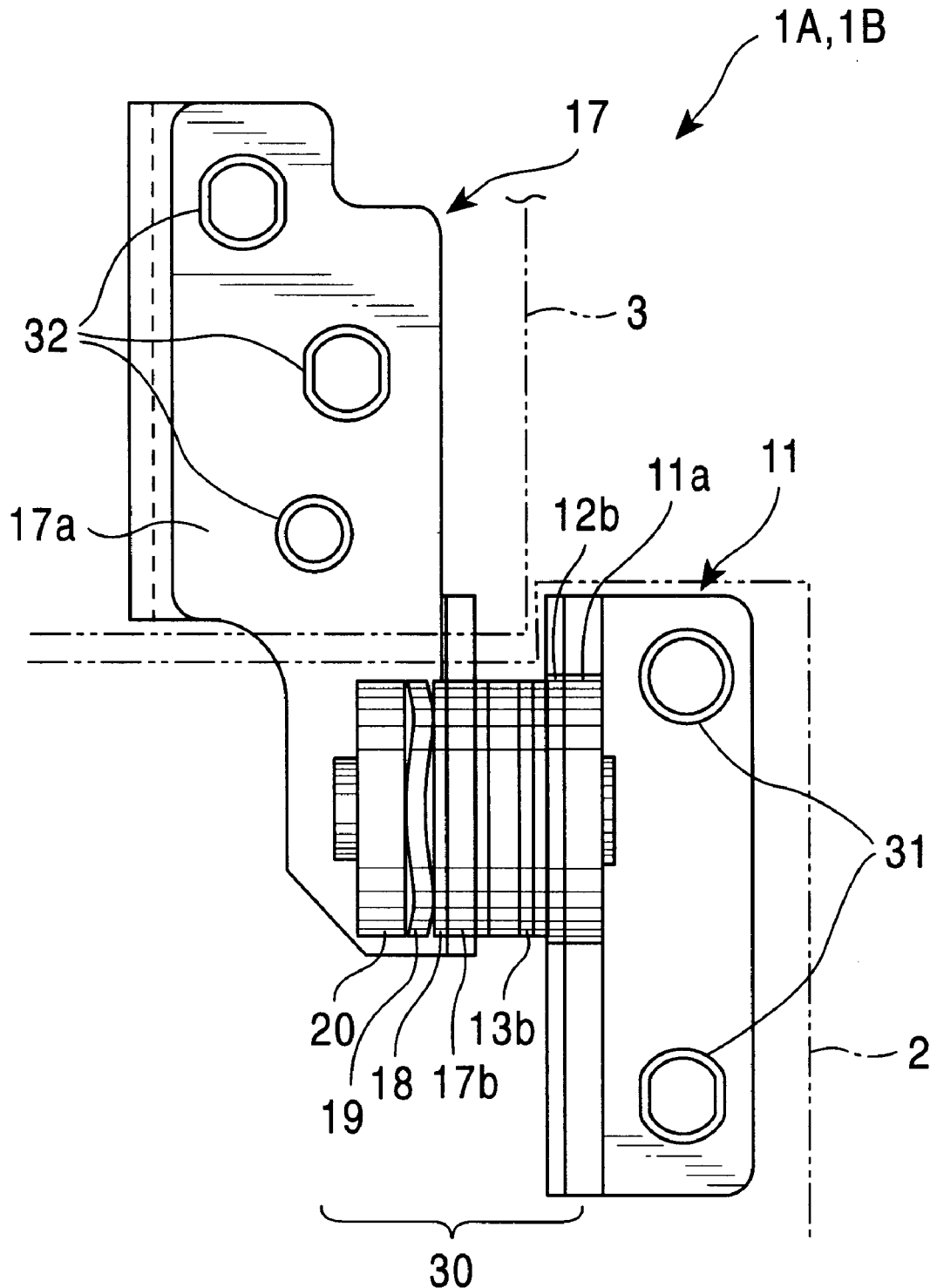
FIG. 2 is a plan view showing a preferred embodiment of the hinge applied to the electronic apparatus shown in FIG. 1.
Figure 3:
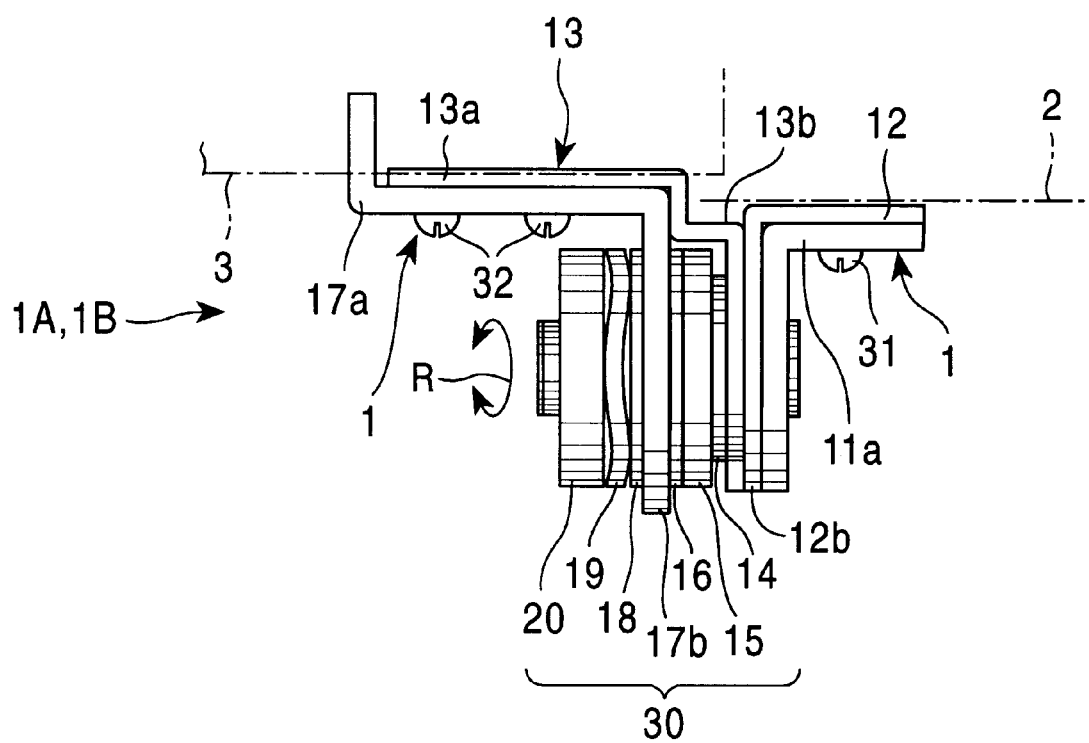
FIG. 3 is a side view of the hinge shown in FIG. 2.
Figure 4:
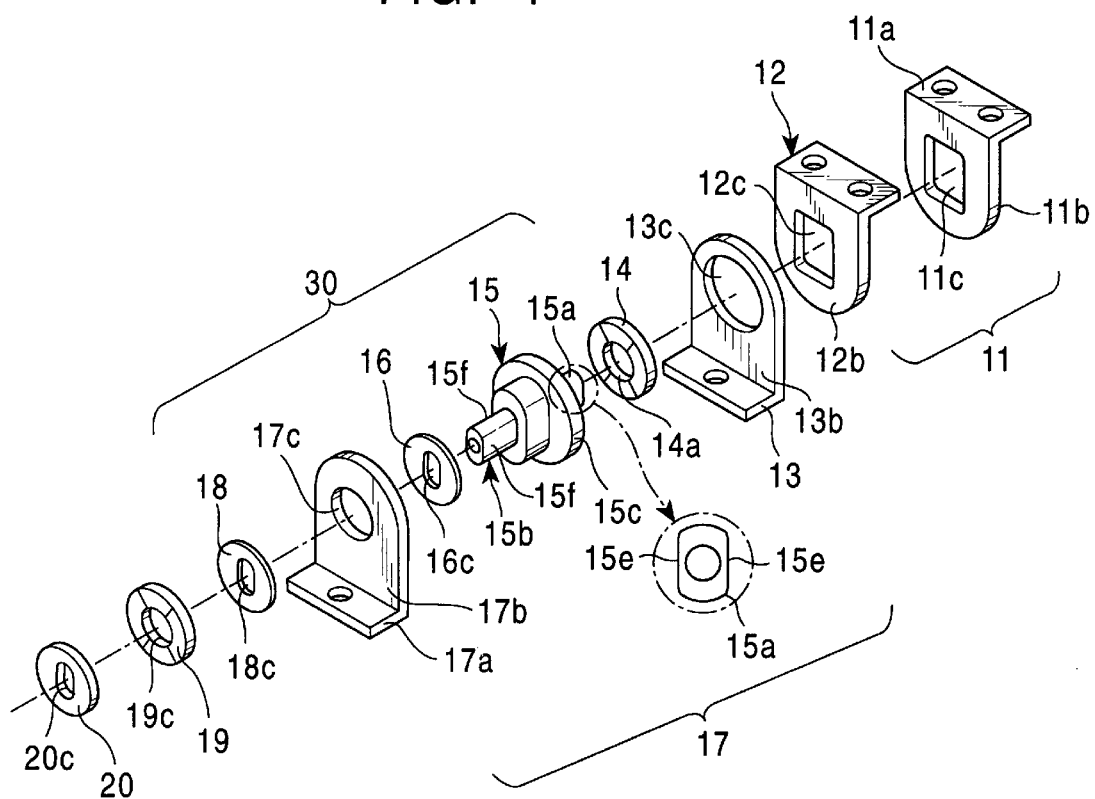
FIG. 4 is an exploded perspective view of the hinge shown in FIGS. 2 and 3.
Figure 5:
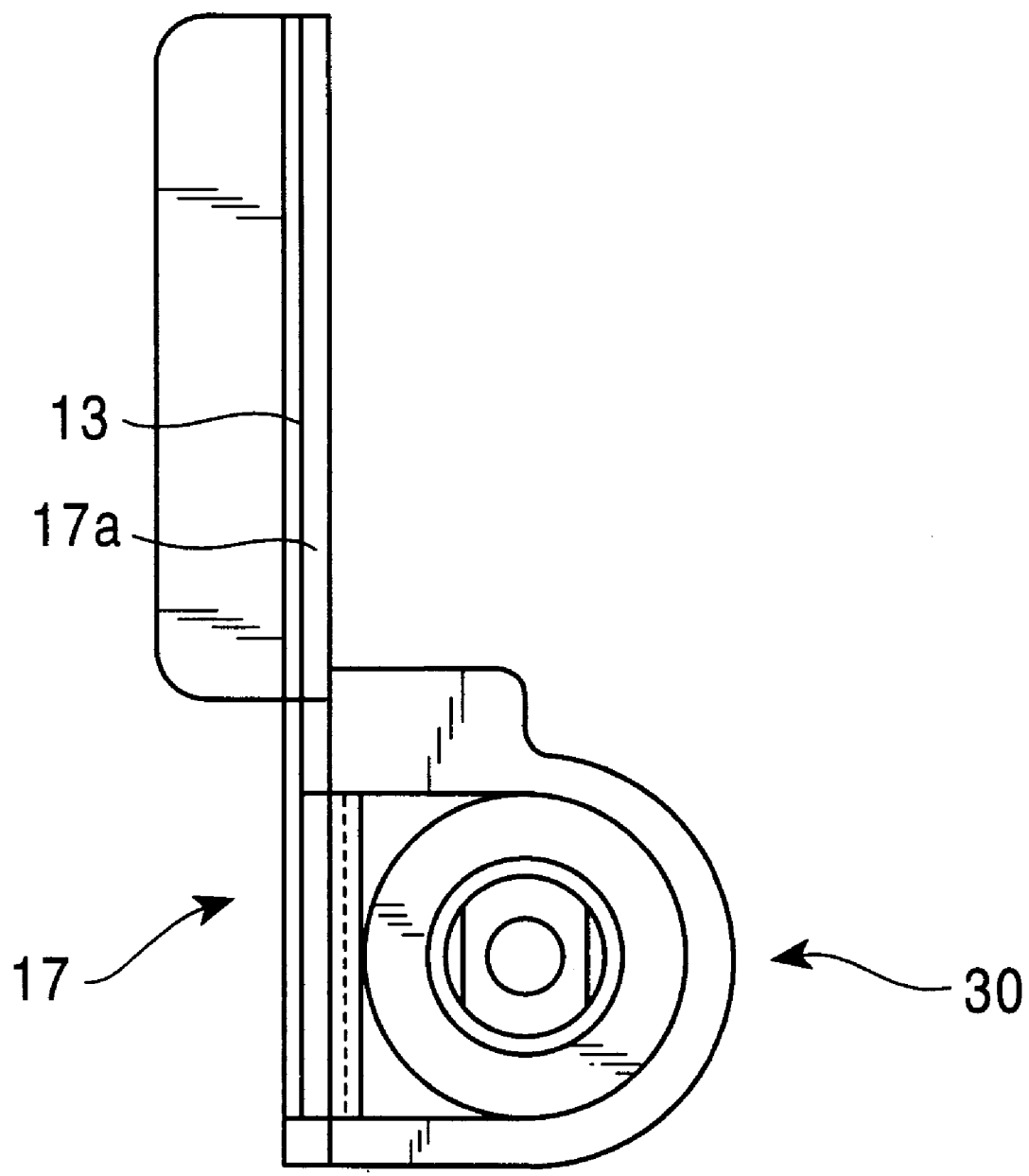
FIG. 5 is a side view of the hinge shown in FIG. 2.
Figure 6:
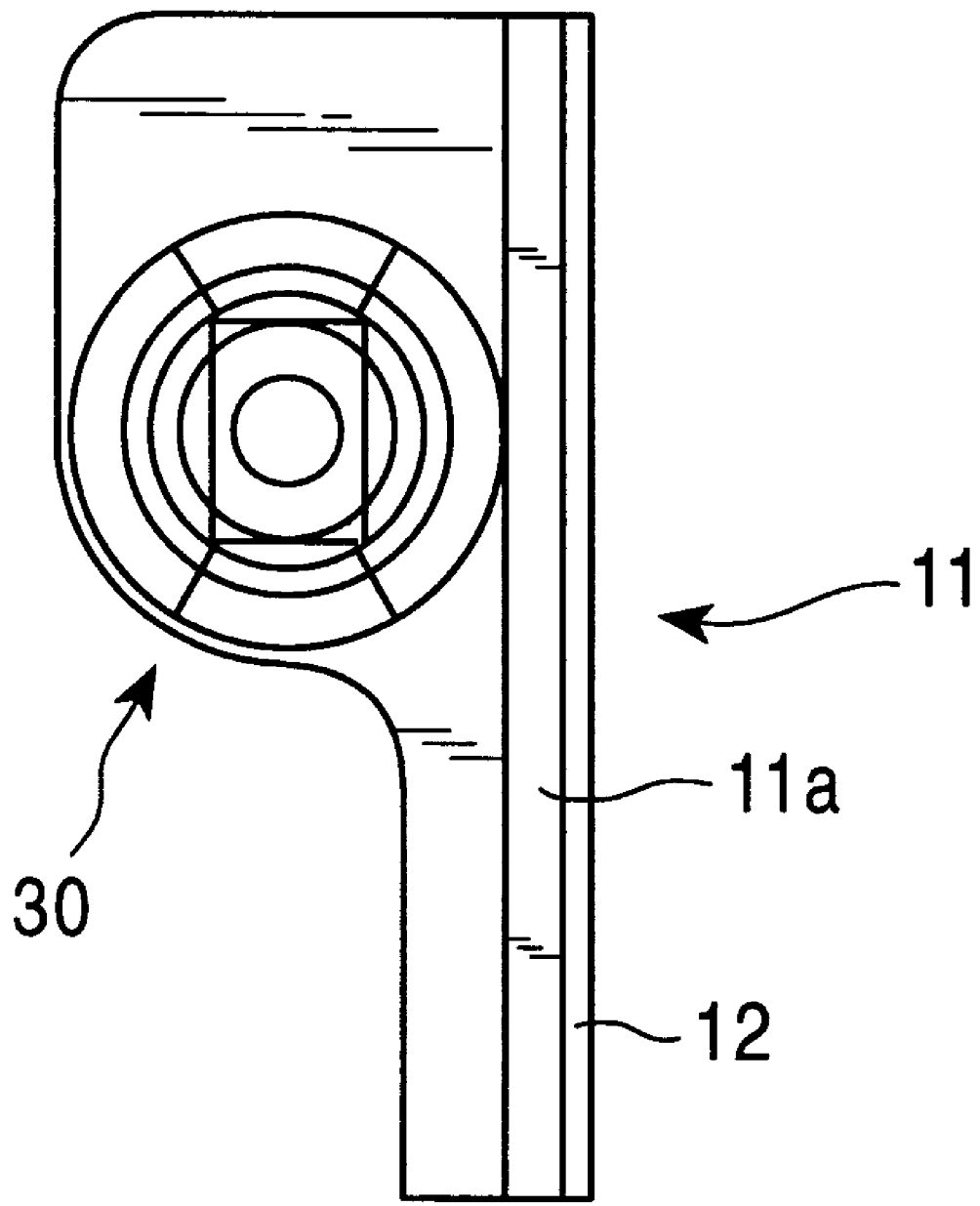
FIG. 6 is another side view of the hinge shown in FIG. 2.

As shown in FIGS. 2 and 3, the hinge 1A has a stationary member 11, a movable member 17 and a joint portion 30. The joint portion 30, shown in FIGS. 4 through 6, is a portion that is capable of joining the stationary member 11 and the movable member 17 mechanically and in such a manner that heat conduction can be effected.

The stationary member 11 is composed of a strength maintaining portion 11a for maintaining mechanical strength and a heat conducting portion 12 for effecting heat conduction. It is desirable that a material having a high level of mechanical strength, for example, stainless steel (SUS), which is an iron type material, be adopted for the strength maintaining portion 11a so that the requisite strength at the time of opening and closing the display portion 3 shown in FIG. 1 and the opening/driving operation itself may be maintained. The strength maintaining portion 11a is preferably formed of a mechanically strong plate material and is, as shown in FIGS. 2 and 3, formed into a substantially L-shaped configuration in sectional view.

It is desirable that the heat conducting portion 12 be formed of a material suitable for heat conduction, for example, a copper type or aluminum type material. The heat conducting portion 12 is formed as a plate, and has a substantially L-shaped configuration so that it can be brought into close contact with the strength maintaining portion 11 and glued or fastened thereto. FIG. 3 shows the L-shaped sectional configuration.

As shown in FIGS. 2 and 3, the strength maintaining portion 11a and the heat conducting portion 12 of the stationary member 11 are in close contact with each other. The stationary member 11 is fastened to the mounting surface side of the main body 2 (the side in contact with the main body) by, for example, screws 31.

FIG. 4 is a perspective view showing an example of the configuration of the strength maintaining portion 11a and the heat conducting portion 12 of the stationary member 11. Rectangular holes 11c and 12c are formed in the erect portion 11b of the strength maintaining portion 11a and the erect portion 12b of the heat conducting portion 12, respectively.

Next, the movable member 17 will be described. As shown in FIGS. 2 and 3, this movable member 17 has a strength maintaining portion 17a and a heat conducting portion 13. The strength maintaining portion is a portion for maintaining mechanical strength, and the heat conducting portion 13 is a portion for effecting heat conduction. To maintain the requisite strength at the time of opening and closing the display portion and the strength thereof, it is desirable for the strength holding portion 17a to be formed of a material having a high level of mechanical strength, such as a stainless steel (SUS), which is an iron type material.

The heat conducting portion 13 may be formed of a material providing good heat conductivity, such as a copper type or aluminum type material. The strength maintaining portion 17a has a substantially L-shaped configuration, and the heat conducting portion also has a substantially L-shaped configuration. However, a portion 13a of the heat conducting portion 13 is in close contact with the strength maintaining portion 17a, and an erect portion 13b of the heat conducting portion 13 is spaced apart from an erect portion 17b of the strength maintaining portion 17a.

FIG. 4 shows three-dimensionally the strength maintaining portion 17a and the heat conducting portion 13 of the movable member 17. Round holes 17c and 13c are formed in the erect portion 17b of the strength maintaining portion 17a and the erect portion 13b of the heat conducting portion 13, respectively. The diameter of the hole 17c is smaller than the diameter of the hole 13c.

Next, the joint portion 30 shown in FIGS. 2 and 3 will be described.

This joint section 30 effects heat conduction between the heat conducting portion 12 of the stationary member 11 and the heat conducting portion 13 of the movable member 17 and, at the same time, joins the stationary member 11 and the movable member 17 mechanically to each other.

FIG. 4 shows the components of this joint portion 30; it comprises a spring washer 14, a shaft 15, washers 16 and 18, a spring washer 19 and a stopper 20.

The shaft 15 is formed of iron or the like in order to maintain the requisite mechanical strength. The shaft 15 includes a main body 15c, a protrusion 15a and another protrusion 15b on the other side. The protrusion 15a is passed through a hole 14a of the spring washer 14 and, further, through the hole 13c of the heat conducting portion 13, the hole 12c of the heat conducting portion 12, and the hole 11c of the strength maintaining portion 11. This protrusion 15a has end surfaces 15e formed such that the protrusion is firmly fitted into the hole 12c of the heat conducting portion 12 and the hole 11c of the strength maintaining portion 11a in such a way that it does not move therein. Thus, the protrusion 15a of the shaft 15 is fitted into the hole 12c of the heat conducting portion 12a and the hole 11c of the strength maintaining portion 11a, whereby it can be firmly secured in position so as not to be detached.

The spring washer 14 is a spring member for pressing the heat conducting portion 12 of the stationary member 11 and the heat conducting portion 13 of the movable member 17 in such a way that they are in close contact with each other. It is made of a metal such as iron.

The washer 16 is a washer arranged between the shaft 15 and the strength maintaining portion 17a of the movable member 17. The hole 16c of the washer 16 is a rectangular hole into which the protrusion 15b of the shaft 15 can be fitted. The protrusion 15b of the shaft 15 also has flat end surfaces 15f. The protrusion 15b is passed through the hole 17c of the strength maintaining portion 17a. This protrusion 15b is passed through the hole 18c of the washer 18 and the hole 19c of the spring washer 19 and firmly fitted into the hole 20c of the stopper 20. That is, the protrusion 15b of the shaft 15 can be firmly secured in position in the hole 20c of the stopper 20 so as not to be detached.

In this way, as shown in FIGS. 2 and 3, the stationary member 11 and the movable member 17 can be integrally connected together by means of the engaging connection between the protrusion 15a of the shaft 15 and the hole 11c of the strength maintaining portion 11 and the engaging connection between the protrusion 15b of the shaft 15 and the hole 20c of the stopper 20. By using this shaft 15, the movable member 17 can rotate with respect to the stationary member 11 in the directions of the arrows R in FIG. 3.

The shaft 15, the washers 16 and 18, the spring washers 14 and 19, the stopper 20, etc. may be formed of a mechanically strong material, such as an iron type material. The heat conducting portion 12 of the stationary member 11 is positioned on the mounting surface side of the main body 2 of the computer shown in FIG. 1 (the side in contact with the main body), and can be secured in position by screws 32 as shown in FIGS. 2 and 3. On the other hand, the heat conducting portion 13a of the movable member 17 is positioned on the mounting surface side of the display portion 3 of the computer 100 shown in FIG. 1 (the surface mounted to the display portion) and can be secured in position by screws 32.

As shown in FIGS. 2 and 3, when the hinge 1A or 1B has been assembled, the erect portion 12b of the heat conducting portion 12 of the stationary member 11 is in close contact with the erect portion 13b of the heat conducting portion 13 of the movable member 17 and, at the same time, the spring washer 14 keeps these erect portions 12b and 13b by its resilient pressing force, so that it is possible to make the thermal resistance in these erect portions 12b and 13b of the heat conducting portions 12 and 13 as low as possible.

The hinge 1A or 1B thus formed not only maintains mechanical strength but also effects heat conduction and heat dissipation. Thus, for example, in the main body 2 and the display portion 3 of the computer 100, it is possible to improve the heat conduction, making it possible for heat to be easily conducted from the side where the quantity of heat is larger, for example, the main body 2 to the side where the quantity of heat is smaller, for example, the display portion 3.

By thus achieving an improvement in heat conductivity, the conduction of heat from the main body portion 2, which generates a relatively large quantity of heat, to the display portion 3, which generates a relatively small quantity of heat, is improved, whereby the requisite space for dissipation can be secured. Further, it is also possible to separately provide the heat conducting portion 12 and the heat conducting portion 13 with heat dissipation means such as a heat sink, and an improvement can be achieved in terms of efficiency in heat dissipation.

For example, when the casing of the main body 2 and the display portion 3 is formed of a light metal such as magnesium, the casing can be used as a heat sink. By thermally connecting this casing, used as a heat sink, to the heat conducting portion 12 and the heat conducting portion 13 of FIG. 3, a further improvement can be achieved in terms of efficiency in heat dissipation.

Further, generally speaking, a material having good thermal conductivity offers low electrical resistance. In view of this, it is possible to connect the stationary member 11 and the movable member 17 of the hinge 1A, 1B with lower electrical resistance.

Next, another embodiment of the hinge of the present invention will be described.

Figure 7:
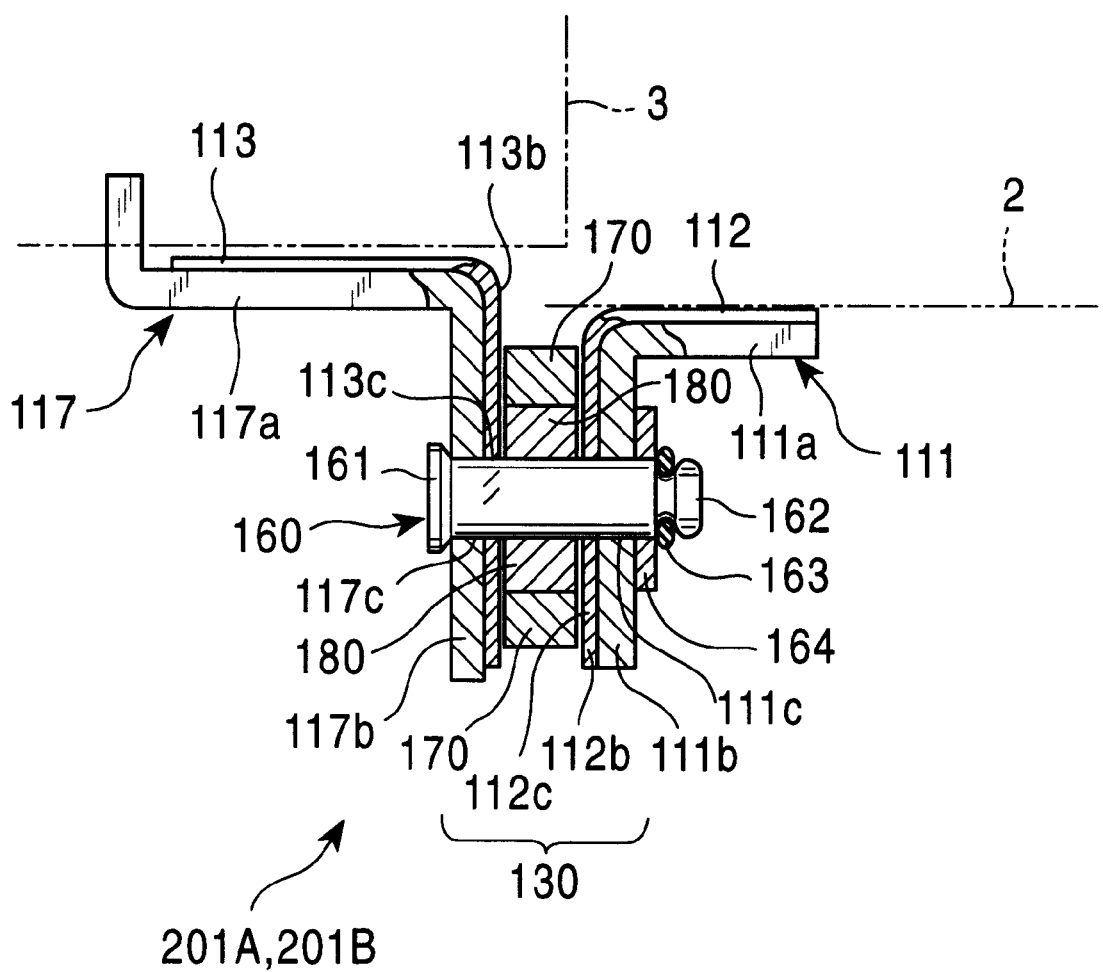
FIG. 7 is a side view showing another embodiment of the hinge of the present invention.

Instead of the hinges 1A and 1B shown in FIG. 1, hinges 201A and 201B shown in FIG. 7 are used. These hinges 201A and 201B can be used as the hinges of the computer 100 as shown in FIG. 1.

The hinge 201A (201B) is equipped with a stationary member 111, a movable member 117 and a joint portion 130.

The stationary member 111 is secured to the main body 2, and the movable member 117 is secured to the display portion 3.

The joint portion 130 effects heat conduction between the stationary member 111 and the movable member 117 while maintaining the mechanical strength of the stationary member 111 and the movable member 117.

The stationary member 111 has a strength maintaining portion 111a and a heat conducting portion 112. The strength maintaining portion 111a may be formed, for example, a mechanically strong material, for example, stainless steel, which is an iron type material. The heat conducting portion 112 is formed of a material having good heat conductivity, for example, a copper type or aluminum type material. The strength maintaining portion 111a and the heat conducting portion 112 have a substantially L-shaped sectional configuration, and the heat conducting portion 112 is in close contact with the strength maintaining portion 111a.

An erect portion 111b of the strength maintaining portion 111a has a hole 111c, and an erect portion 112b of the heat conducting portion 112 has a hole 112c.

The movable member 117 also has a strength maintaining portion 117a and a heat conducting portion 113. The strength maintaining portion 117a has a substantially L-shaped sectional configuration and may be formed of a mechanically strong material, such as stainless steel, which is an iron type material. The heat conducting portion 113 also has a substantially L-shaped sectional configuration and is formed of a material having good heat conductivity, such as a copper type or aluminum type material.

The strength maintaining portion 117a and the heat conducting portion 113 are in close contact with each other. A hole 117c is formed in an erect portion 117b of the strength maintaining portion 117, and a hole 113c is formed in an erect portion 113b of the heat conducting portion 113.

Next, the joint portion 130 will be described. The joint portion 130 includes a shaft 160, a heat conducting ring 170 and a torque bush 180. One end 161 of the shaft 160 is formed as a stopper, which has a diameter larger than the diameter of the hole 117c of the strength maintaining portion 117a, thus serving as a retainer. An E-ring 163 is fitted onto the other end 162 of the shaft 160, and a washer 164 is arranged between this E-ring 163 and the erect portion 111b, whereby the shaft 160 is prevented from being detached from the strength maintaining portion 117a and prevented from being detached from the strength maintaining portion 111a.

The torque bush 180 and the heat conducting ring 170 are arranged between the heat conducting portions 112 and 113. That is, the torque bush 180 and the heat conducting ring 170 are coaxially arranged around the shaft 160. The heat conducting ring 170 is a ring (separate member) for effecting heat conduction between the heat conducting portion 117 and the heat conducting portion 113. It is a ring formed, for example, of a material having good heat conductivity, for example, a copper type or aluminum type material.

The torque bush is formed of resin or the like. It is a member for assisting in the rotation between the stationary member 111 and the movable member 117.

The heat conducting portion 112 of the stationary member 111 is positioned on the mounting surface side of the main body 2 (the side in contact with the main body) and secured in position by, for example, screws. The heat conducting portion 113 of the movable member 117 is positioned on the mounting surface side of the display portion (the surface in contact with the mounting surface of the display portion 2), and the movable member 117 is secured to the display portion 3 side by screws or the like.

As in the case of the hinges 1A and 1B of FIGS. 2 through 6 described above, in the construction of the hinges 201A and 201B of FIG. 7, mechanical strength maintaining function and heat conducting function are provided.

In the hinges 1A and 1B of FIGS. 2 through 6, the heat conducting portion 12 of the stationary member 11 and the heat conducting portion 13 of the movable member 17 are in direct contact with each other to thereby effect heat conduction therebetween. In the hinges 201A and 201B of FIG. 7, in contrast, the heat conduction between the heat conducting portion 112 of the stationary member 111 and the heat conducting portion 113 of the movable member 117 is effected by using a separate heat conducting ring 170. That is, in the hinges 201A and 201B, one heat conducting portion 112 is arranged in the vicinity of the other heat conducting portion 113 but they are not in direct contact with each other.

The present invention is not restricted to the above-described embodiments.

Various modifications are possible regarding the construction of the hinges. For example, although the heat conducting portions having good heat conductivity and arranged along the stationary member and the movable member may be positioned on the mounting surface side of the main body 2 or the display portion 3 as shown in FIGS. 3 and 7, they may also be arranged on the screwing side.

In the embodiment shown in FIGS. 2 through 6, it is possible to cylindrically cover the shaft 15 with a material having good heat conductivity. In the embodiment shown in FIG. 7, the shaft 160 may be formed as a cylinder and a material having good heat conductivity may be passed through it.

Here, experimental data on the hinge of the embodiment of the present invention shown in FIG. 8 will be briefly described comparing it with experimental data on the ordinary hinge shown in FIG. 9.

Referring to FIGS. 8 and 9, a heat conducting portion made of aluminum was secured to each of the stationary member and the movable member of a hinge. The heat conducting portion on the stationary member side was heated, and the changes with time in the temperatures of the stationary member and the movable member were measured. As is apparent from comparison of the embodiment of the present invention shown in FIG. 8 with the ordinary hinge shown in FIG. 9, the difference in temperature between the stationary member and the movable member is small in the hinge of the embodiment of the present invention shown in FIG. 8. In the hinge of the embodiment of the present invention, the temperature on the stationary member side does not rise because heat is conducted through the hinge to the movable member side.

FIG. 10 shows an example of the physical constants of heat conducting materials at 0° C. used in the heat conducting portions of the present invention.

In the embodiments shown, the electronic apparatus to which the hinge of the present invention is applied is a so-called portable computer. However, it is naturally also possible to apply it to other types of electronic apparatus. The electronic apparatuses to which the present invention is applicable include various types of electronic apparatus generating heat, such as a portable information terminal, a portable telephone, and a radio telegraph.

The heat conducting portion of the stationary member and the heat conducting portion of the movable member may be positioned on the side in contact with the surface contributing heat dissipation or the heat dissipation surface or on either side thereof. The surface contributing to heat dissipation means the heat dissipating portion, for example, of the circuit board of the main body 2 or the display portion 3, and the heat dissipation surface means, for example, the casing of the main body 2 or the display portion 3 which is made of a light metal such as magnesium.

As described above, in accordance with the present invention, it is possible to effect heat dissipation in an electronic apparatus without having to increase the size of the electronic apparatus.

What is claimed is:

1. A hinge for electronic apparatus provided for the purpose of foldably joining first and second portions of an electronic apparatus to each other, the hinge comprising:

a stationary member which includes a strength maintaining portion formed of a material of a high mechanical strength for maintaining mechanical strength and a heat conducting portion formed of a heat conductible material for effecting heat conduction and which is joined to said first portion, a movable member movable relative to said stationary member which includes a strength maintaining portion formed of a material of a high mechanical strength for maintaining mechanical strength and a heat conducting portion formed of a heat conductible material for effecting heat conduction and which is joined to said second portion, and a joint portion for joining said stationary member and said movable member to each other while actively cooperating to effect heat conduction between the heat conducting member of said stationary member and the heat conducting portion of said movable member.

2. A hinge for electronic apparatus according to claim 1, wherein said joint portion effects heat conduction between the heat conducting portion of said stationary member and the heat conducting portion of said movable member by bringing the heat conducting portion of said stationary member and the heat conducting portion of said movable member into direct contact with each other.

3. A hinge for electronic apparatus according to claim 1, wherein said joint portion effects heat conduction between the heat conducting portion of said stationary member and the heat conducting portion of said movable member through a separate heat conductive member.

4. A hinge for electronic apparatus according to claim 1, wherein said joint portion effects heat conduction between the heat conduction portion of said stationary member and the heat conducting portion of said movable member by positioning the heat conducting portion of the stationary member to be in close contact with the heat conducting portion of said movable member.

5. A hinge for electronic apparatus according to claim 1, wherein the heat conducting portion of said stationary member and the heat conducting portion of said movable member are positioned on the side contributing to heat dissipation.

6. A hinge for electronic apparatus according to claim 1, wherein the heat conducting portion of said stationary member and the heat conducting portion of said movable member are good conductors of electricity.

7. A hinge for electronic apparatus according to claim 1, wherein said first portion is a main body of a portable electronic apparatus and wherein said second portion is a display portion that can be folded on the main body.

8. An electronic apparatus having a hinge which includes first and second portions, said second portion being foldable with respect to said first portion, said electronic apparatus comprising:

a stationary member which includes a strength maintaining portion formed of a material of high mechanical strength for maintaining mechanical strength and a heat conducting portion formed of a heat conductible material for effecting heat conduction and which is joined to said first portion, a movable member movable relative to said stationary member which includes a strength maintaining portion formed of a material of a high mechanical strength for maintaining mechanical strength and a heat conducting portion formed of a heat conductible material for effecting heat conduction and which is joined to said second portion, and a joint portion for joining said secondary member and the movable member to each other while actively cooperating to effect heat conduction between the heat conducting portion of said stationary member and the heat conducting portion of said movable member.

9. An electronic apparatus according to claim 8, wherein said first portion is a main body of a portable electronic apparatus and wherein said second portion is a display portion that can be folded on said main body.

* * * * *